Figure 1:
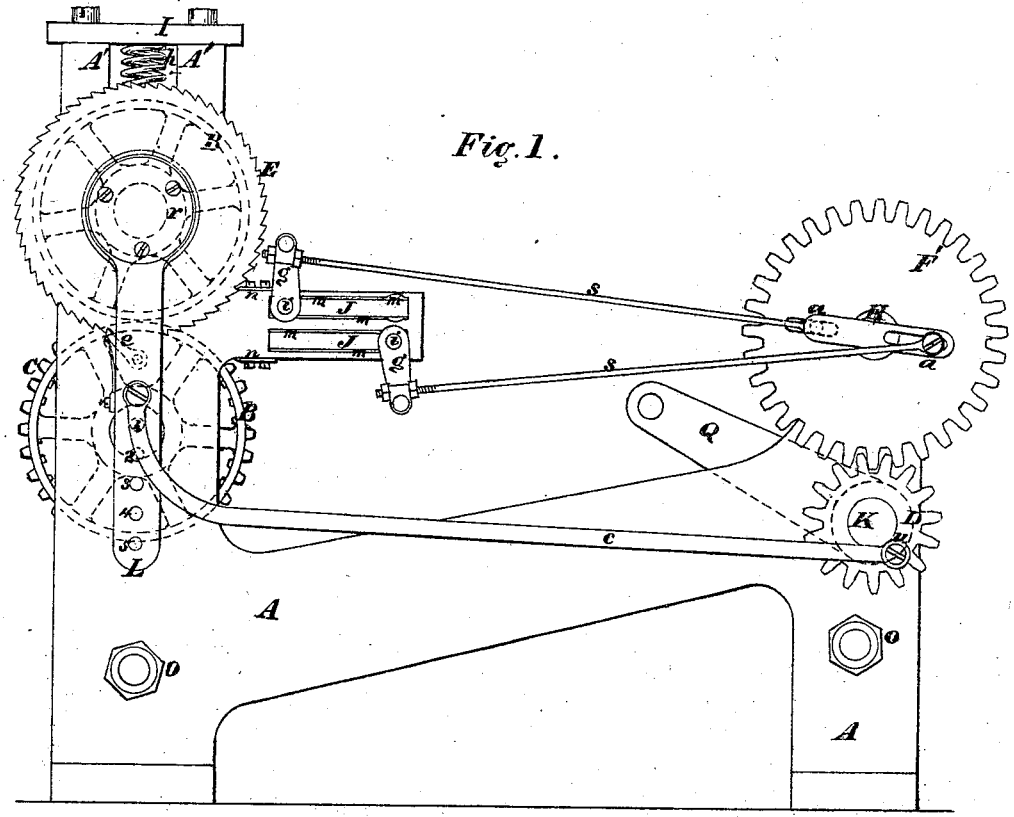

O. M. CHAMBERLAIN.
Box Plaiting-Machines.

No. 136,362.  Patented March 4, 1873.

Witnesses.

O. M. CHAMBERLAIN.
Box Plaiting-Machines.

No. 136,362.

3 Sheets--Sheet 2.

Patented March 4, 1873.

Witnesses.

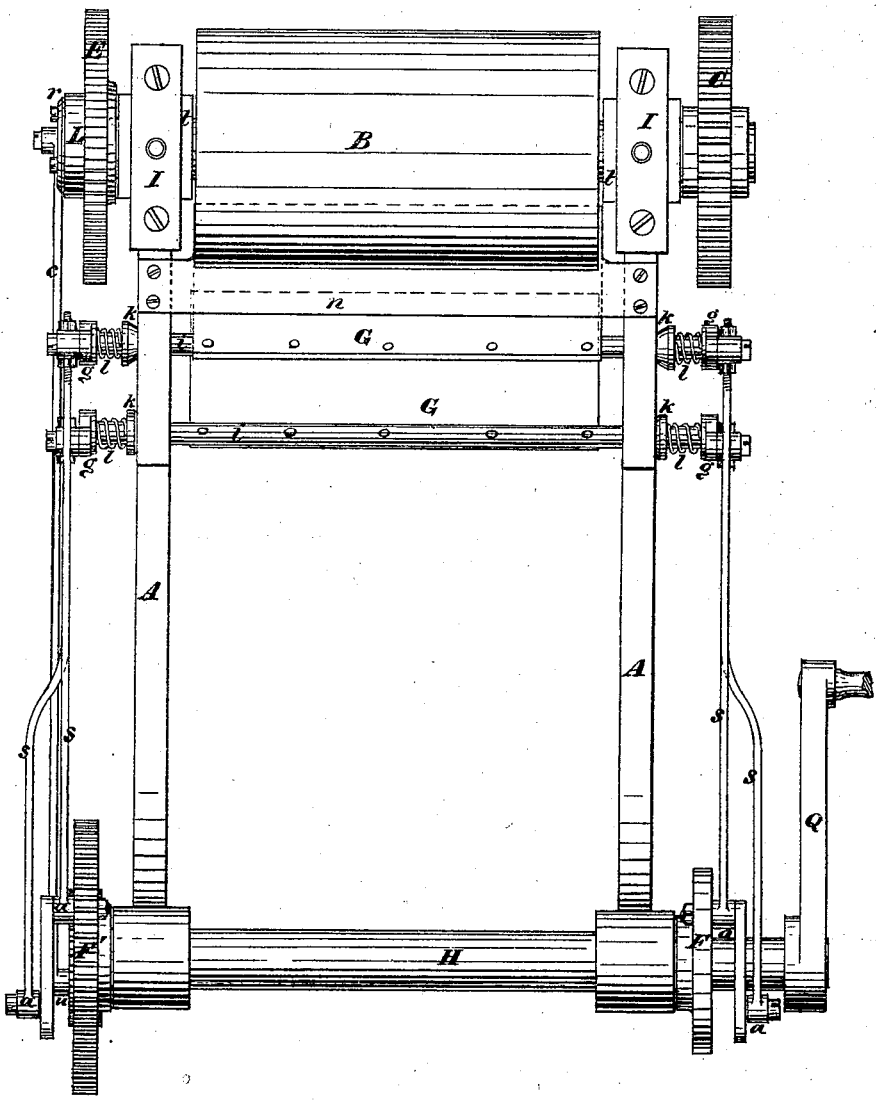

UNITED STATES PATENT OFFICE.

ORANGE M. CHAMBERLAIN, OF NEW YORK, N. Y., ASSIGNOR OF ONE-HALF HIS RIGHT TO WM. B. CARRINGTON, OF SAME PLACE.

IMPROVEMENT IN BOX-PLAITING MACHINES.

Specification forming part of Letters Patent No. 136,362, dated March 4, 1873.

*To all whom it may concern:*

Be it known that I, ORANGE M. CHAMBERLAIN, of the city, county, and State of New York, have invented a new and useful Improvement in Box-Plaiting Machines; and I do declare that the following is a full, clear, and exact description thereof, as will enable others skilled in the art to make and use the same, reference being had to the drawing accompanying and forming part of this specification.

My invention relates to an improved manner of operating the formers in a box-plaiting machine, and making them adjustable for varying the size and form of the plait.

Figure 2:
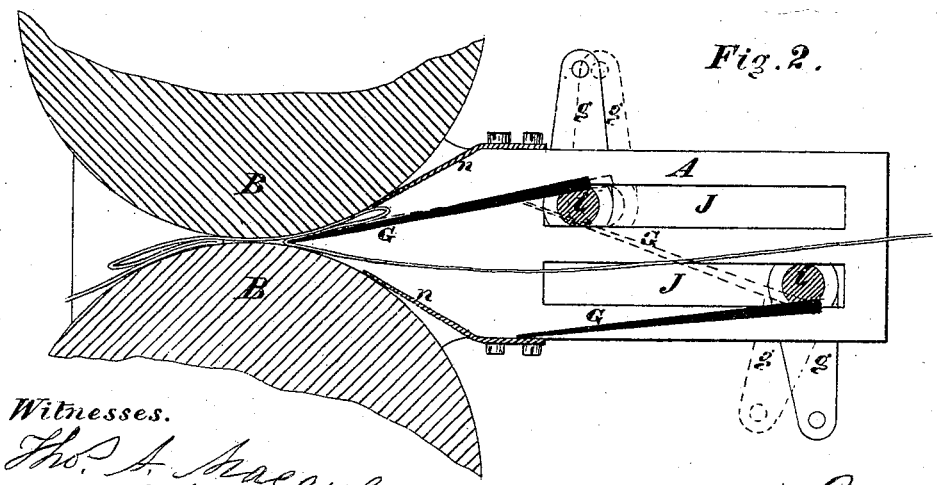
Figure 3:
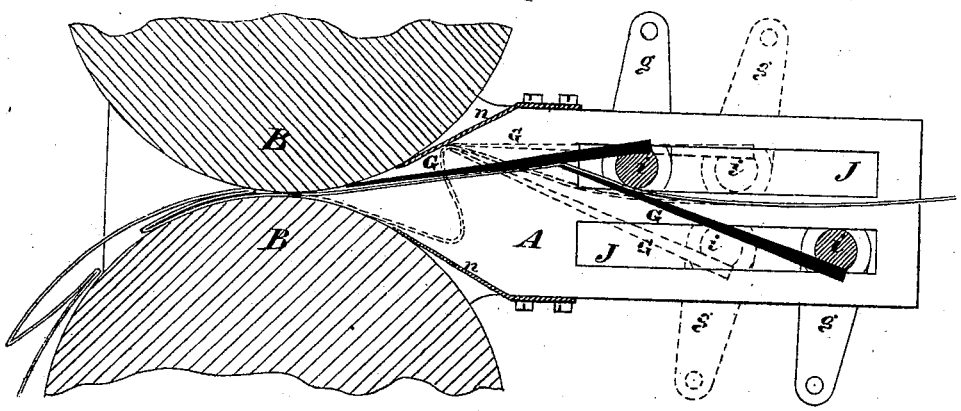
Figure 4:
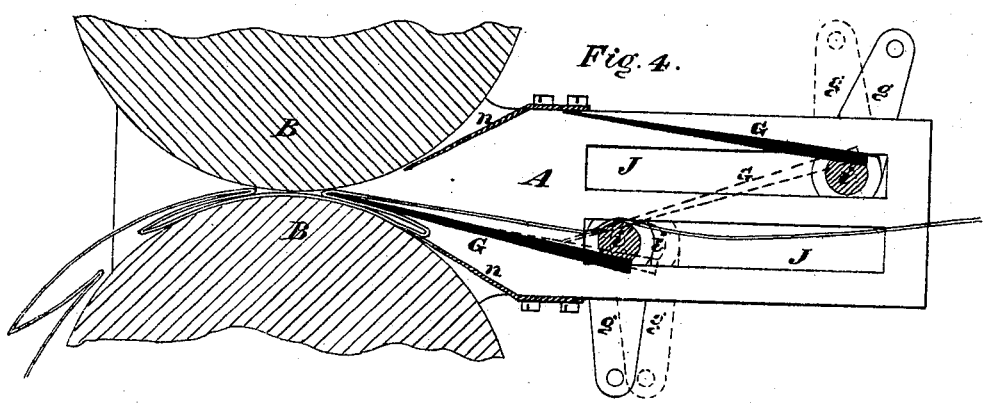
Figure 6:
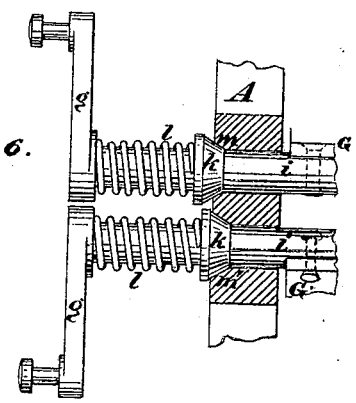
Figure 5:
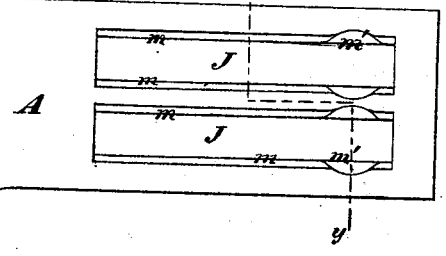

Figure 1 is a side elevation, showing the manner of actuating and adjusting the formers which make the box-plait; the manner of operating the delivering-rollers after the plaits are formed; and the springs for keeping the delivering-rollers in contact with the goods, and to give the requisite pressure, that the plaits may retain the form given them by the formers; also, the manner of adjusting the traverse of the formers, and regulating the amount of movement to be given to the delivering-rollers, when it becomes necessary to change the size or appearance of the plait; also, the guide-plates secured to the frame by set-screws. Fig. 2 is a cross-section, showing the guide-plates, and the position of the formers and crank-levers when the upper former has completed a plait. At this point the rollers have commenced to deliver the plait now formed. Fig. 3 is a similar view to Fig. 2, showing the plait just formed by the upper former and delivered by the rollers, and the position of the lower former about to commence a new plait, as also shown by dotted lines in Fig. 2. The dotted lines in Fig. 3 show a plait half formed by the lower former. Fig. 4 is a similar view to Figs. 2 and 3, showing the position of the formers and crank-levers when the lower former has finished a plait and the rollers are commencing to deliver the same. The dotted lines in Fig. 4 show the position of the upper former before commencing a new plait. A complete box-plait is now formed, each former alternately taking similar positions, and the rollers delivering the plaits as soon as formed. Fig. 5 is an enlarged outside elevation of that portion of the frame which forms guides for the spindles to which the formers are attached, and shows the form of the bevel of the beveled edges of the guide. Fig. 6 is a cross-section through the dotted lines $x$ and $y$. Fig. 5 shows the position of the friction-cones in the beveled guides, and the springs pressing them into position. Fig. 7 is a plan view, showing the position of the cog-wheels, the position of the cranks, and the manner of changing the traverse of the formers; also, the method by which the lever L is suspended on the roller-shaft, and kept in position by the cap $r$.

The construction is as follows: A, Fig. 1, represents one side of the frame, secured to another side of the same frame by two round bars passing through holes in each side, and secured by nuts $o$ on the outside. L is a lever, having a series of holes for connecting the pitman when the movement of the rollers is to be changed. B are metal rollers, one having its bearings in the frame, and the other mounted in boxes $t\, t$, which are fitted into guides in the upper portion of the sides A A of the frame. C are cog-wheels, rigidly secured to the roller-shafts, and which mesh into each other, and having an intermittent motion given them by the crank $u$ on the spur-wheel D through the pitman $c$, lever L, pawl $e$, and ratchet-wheel E. F' and F are two disks, secured to the shaft H, (one of them forming the cog-wheel F',) to each of which are connected double cranks $a\, a$, for giving motion through pitmen $s\, s$ and crank-levers $g\, g$ to the formers G G, which form the plaits. I is a cap, against which the springs $l$ act on the bearings $t\, t$ of the rollers, to press the plaits as they are delivered. J J are guides in which the spindles $i$ traverse. K are cones, fitting loosely on the former-spindles, and which, by springs $l\, l$, are pressed against the beveled edges $m\, m$ of the guides J J. $m'\, m'$ show the bevels enlarged at the ends of the guides, from which the formers start to form a plait. By means of the pressure of the springs against the cones, sufficient friction is obtained to enable the formers to firmly press on the cloth before any forward movement of the formers takes place. The friction given by the cones on the opposite ends of the guides also enables the formers to be raised off the cloth before commencing its return movement, allowing the cloth to pass easily through the rollers.

The operation is as follows: The cloth to be plaited is passed in between the formers and through the rollers. Motion is given to the shaft K, and one rotation made by the cog-wheel D. The cog-wheel F' will be turned one-half rotation; by this half rotation one of the formers will be pushed forward and one-half of the box-plait formed, and the other former drawn back to the starting-point. After the first former has made a plait, forward motion in the former ceases for a short period, while the crank that carried it forward passes its center and raises the former from the cloth. During this short period of rest in the former, the crank $u$, which travels twice as fast as the cranks $a$ $a$, has moved the ratchet-lever L, and turned the rollers by the pawls $e$ and ratchet-wheel E, and has delivered the plait just formed through the rollers, as shown in Fig. 3. A second rotation of the shaft K and the wheel D will have caused the wheel F' to have made a complete rotation, and carried the other former forward, making a plait and delivering it through the rollers the same as the first, and carried the first former back ready to commence another plait, each former alternately making a plait for each rotation of the shaft K, and a full box-plait being made at each rotation of the shaft H.

I have now particularly described my invention and the manner in which it may be carried into effect; and what I claim, and desire to secure by Letters Patent, is—

1. The double cranks $a$ $a$ and pitmen $s$ $s$, for operating the formers.

2. The crank-levers $g$ $g$ and spindles $i$ $i$, in combination with the formers G G.

3. The friction-cones K K and springs $l$ $l$, in combination with the guides J J.

4. The combination of the shafts H and K, for the purpose described.

5. The combination of the cranks $a$ $a$, pitmen $s$ $s$, with the intermittent action of the delivering-rollers B.

O. M. CHAMBERLAIN.

Witnesses:
   THOS. A. MACAULAY,
   JOS. G. GRIFFITH.